(12) United States Patent
Komura (10) Patent No.: US 11,486,476 B2
(45) Date of Patent: Nov. 1, 2022

(54) EXTENSION/CONTRACTION MECHANISM AND MOBILE BODY

(71) Applicant: TOYOTA JIDOSHA KABUSHIKI KAISHA, Toyota (JP)

(72) Inventor: Hirotaka Komura, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 17/218,862

(22) Filed: Mar. 31, 2021

(65) Prior Publication Data

US 2021/0341040 A1 Nov. 4, 2021

(30) Foreign Application Priority Data

Apr. 30, 2020 (JP) .............................. JP2020-080137

(51) Int. Cl.
| | |
|---|---|
| *F16H 19/06* | (2006.01) |
| *F16H 9/26* | (2006.01) |
| *F16H 59/38* | (2006.01) |
| *F16H 59/46* | (2006.01) |

(52) U.S. Cl.
CPC ............ *F16H 19/0618* (2013.01); *F16H 9/26* (2013.01); *F16H 59/38* (2013.01); *F16H 59/46* (2013.01); *F16H 2702/02* (2013.01)

(58) Field of Classification Search
CPC ........ F16H 19/0618; F16H 9/26; F16H 59/38; F16H 59/46; F16H 2702/02; F16H 25/2409; F16H 59/36; F16H 37/124; F16H 57/08

See application file for complete search history.

(56) References Cited

U.S. PATENT DOCUMENTS

| | | | | | |
|---|---|---|---|---|---|
| 5,588,258 | A | * | 12/1996 | Wright | ................. E05F 15/627 49/340 |
| 7,566,092 | B2 | * | 7/2009 | Paton | ................... E05F 15/622 296/106 |

FOREIGN PATENT DOCUMENTS

| | | | | |
|---|---|---|---|---|
| JP | 2007192257 | A | * | 8/2007 |
| JP | 4607772 | B2 | | 1/2011 |
| JP | 2019138356 | A | * | 8/2019 |

\* cited by examiner

*Primary Examiner* — Justin Holmes
(74) *Attorney, Agent, or Firm* — Oliff PLC (57) ABSTRACT

An extension/contraction mechanism in which an extension/contraction part is able to turn is provided. An extension/contraction mechanism according to one aspect of the present disclosure includes a first drive source connected to a sending/pulling part so as to be able to transmit a drive force, and a second drive source connected to the sending/pulling part and a turning part that rotatably supports the sending/pulling part so as to be able to transmit a drive force via a gear group. When a rotational speed transmitted to the sending/pulling part to rotate the sending/pulling part by the first drive source is equal to a rotational speed transmitted to the sending/pulling part to rotate the sending/pulling part by the second drive source, an extension/contraction part turns via the turning part. When the above rotational speeds are different from each other, the extension/contraction part is extended or contracted.

4 Claims, 13 Drawing Sheets

EXTENSION/CONTRACTION MECHANISM AND MOBILE BODY

CROSS REFERENCE TO RELATED APPLICATIONS

This application is based upon and claims the benefit of priority from Japanese patent application No. 2020-80137, filed on Apr. 30, 2020, the disclosure of which is incorporated herein in its entirety by reference.

BACKGROUND

The present disclosure relates to an extension/contraction mechanism and a mobile body, and relates to, for example, an extension/contraction mechanism and a mobile body including an extension/contraction part that is extended when a sending/pulling part is rotated in one direction and is contracted when the sending/pulling part is rotated in another direction.

For example, an extension/contraction mechanism disclosed in Japanese Patent No. 4607772 includes an extension/contraction part including a first belt provided with engagement pins along a long side thereof and a second belt provided with engagement holes along a long side thereof, a sending/pulling part in which grooves having a spiral shape are formed on a peripheral surface thereof and that is rotated, and a base part that supports the extension/contraction part and the sending/pulling part.

In the above extension/contraction mechanism, when the sending/pulling part is rotated in one direction in a state in which the engagement pins are engaged with the engagement holes in such a manner that the first belt and the second belt are offset from each other and in which the engagement pins are inserted into the grooves of the sending/pulling part, then the first belt and the second belt are drawn out and wound in a spiral shape, which causes the extension/contraction part to be extended. On the other hand, when the sending/pulling part is rotated in the other direction, the first belt and the second belt are drawn in and the extension/contraction part is contracted while the state in which the first belt and the second belt are wound is loosened.

SUMMARY

The applicant has found the following problem. While the extension/contraction mechanism disclosed in Japanese Patent No. 4607772 has a configuration in which the extension/contraction part is extended or contracted, the extension/contraction part is not configured to turn.

The present disclosure has been made in view of the above problem and provides an extension/contraction mechanism and a mobile body in which an extension/contraction part is able to turn.

An extension/contraction mechanism according to one aspect of the present disclosure is an extension/contraction mechanism including an extension/contraction part that is extended when a sending/pulling part is rotated in one direction and is contracted when the sending/pulling part is rotated in another direction, the extension/contraction mechanism including:
 a first drive source connected to the sending/pulling part in such a way that the first drive source is able to transmit a drive force to the sending/pulling part; and
 a second drive source connected to the sending/pulling part and a turning part that rotatably supports the sending/pulling part in such a way that the second drive source is able to transmit a drive force to the sending/pulling part and the turning part via a gear group, in which
 when a rotational speed to be transmitted to the sending/pulling part in order to rotate the sending/pulling part by the first drive source is equal to a rotational speed to be transmitted to the sending/pulling part in order to rotate the sending/pulling part by the second drive source, the extension/contraction part turns via the turning part, and
 when the rotational speed to be transmitted to the sending/pulling part in order to rotate the sending/pulling part by the first drive source is different from the rotational speed to be transmitted to the sending/pulling part in order to rotate the sending/pulling part by the second drive source, the extension/contraction part is extended or contracted.

With the above structure, it is possible to achieve an extending/contracting motion and a turning motion of the extension/contraction part by the first drive part and the second drive part.

In the above extension/contraction mechanism,
 the gear group may include:
 a first gear to which a drive force is input from the second drive source; and
 a planetary gear rotatably supported by the turning part, and the planetary gear may include:
 a second gear connected to a tooth part formed on an inner peripheral surface of the first gear in such a way that the second gear is able to transmit a drive force to the tooth part;
 a third gear connected to a tooth part formed on an outer peripheral surface of the sending/pulling part in such a way that the third gear is able to transmit a drive force to the tooth part; and
 a rotation shaft that is rotatably supported by the turning part and to which the second gear and the third gear are fixed.

In the above-described extension/contraction mechanism, the extension/contraction part may be extended when the sending/pulling part is rotated in one direction, a first belt and a second belt are sent out, and the first belt and the second belt are engaged with each other and wound in a spiral shape, and the extension/contraction part may be contracted when the sending/pulling part is rotated in another direction, the first belt and the second belt are retracted, and the state in which the first belt and the second belt are engaged with each other and wound is loosened.

A mobile body according to one aspect of the present disclosure includes the above-described extension/contraction mechanism.

According to the present disclosure, it is possible to provide an extension/contraction mechanism and a mobile body in which an extension/contraction part is able to turn.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific embodiments to which the present disclosure is applied will be described in detail. However, the present disclosure is not limited to the following embodiments. Further, for the sake of clarity of the description, the following descriptions and the drawings are simplified as appropriate.

First Embodiment

Figure 1:
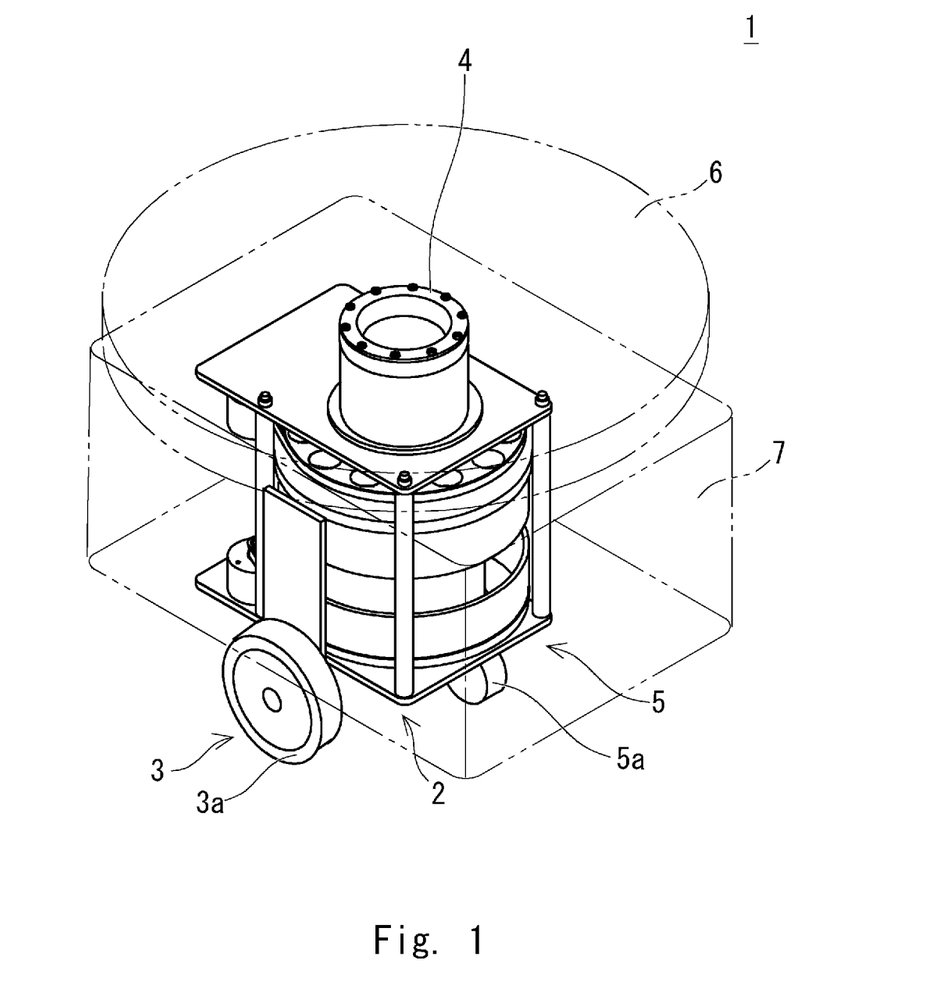
FIG. 1 is a perspective view schematically showing a mobile body according to an embodiment.
Figure 2:
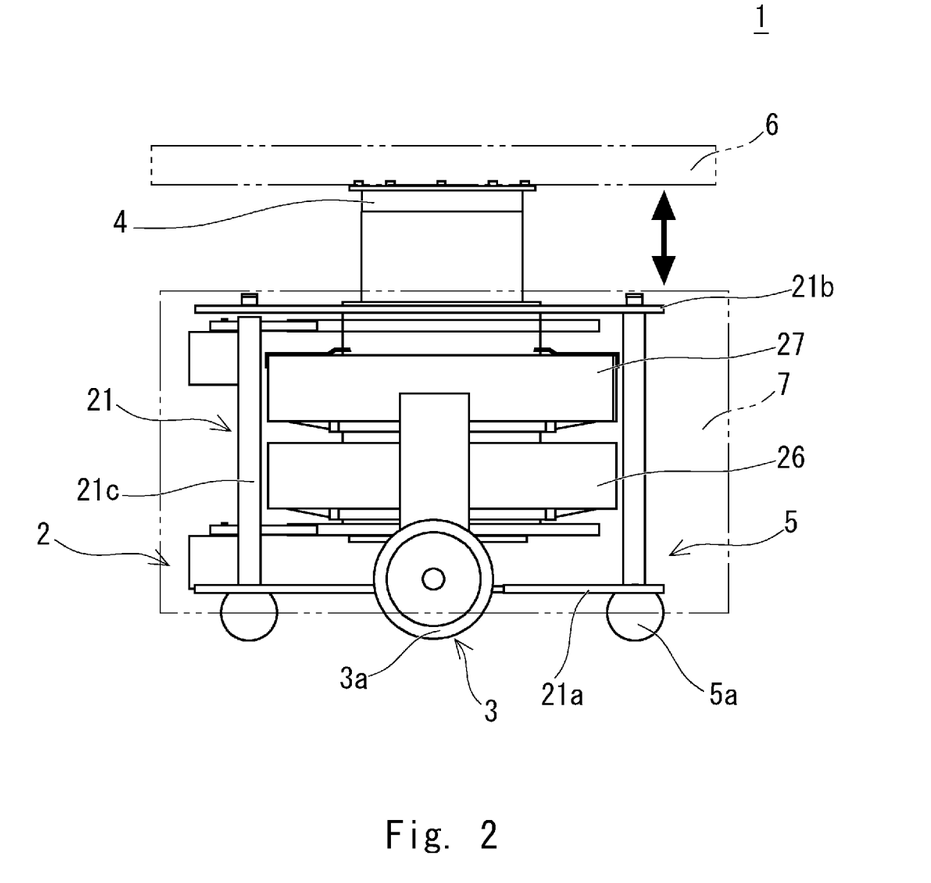
FIG. 2 is a side view schematically showing the mobile body according to the embodiment.

First, a basic structure of a mobile body in which an extension/contraction mechanism according to this embodiment is employed will be described. FIG. 1 is a perspective view schematically showing the mobile body according to this embodiment. FIG. 2 is a side view schematically showing the mobile body according to this embodiment.

As shown in FIGS. 1 and 2, a mobile body 1 according to this embodiment includes an extension/contraction mechanism 2 and a drive part 3. The extension/contraction mechanism 2 includes an extension/contraction part 4 and a base part 5. The extension/contraction part 4 is a telescopic cylindrical body that can be extended/contracted, and a plate 6 is provided, for example, in an upper end part of the extension/contraction part 4, although the details of the extension/contraction part 4 will be described later.

The base part 5 supports the extension/contraction part 4 so that the extension/contraction part 4 can be extended/contracted, although the details of the base part 5 will be described later. Free casters 5a are provided, for example, in the front end part and the rear end part on the lower surface of the base part 5. The base part 5 may be, for example, covered with a cover 7. FIGS. 1 and 2 each indicate the plate 6 and the cover 7 by alternate long and two short dashes lines so that the structure of the mobile body 1 becomes clear.

The drive part 3 includes right and left drive wheels 3a, a motor (a drive source; not shown) and the like. The right and left drive wheels 3a, the motor and the like are supported by the base part 5. This mobile body 1 travels forward, backward, or turns by rotationally driving, for example, the right and left drive wheels 3a separately from each other. Then the extension/contraction part 4 is extended or contracted in the vertical direction, whereby the plate 6 is displaced in the vertical direction. The mobile body 1 may be operated either by autonomous control or by an external instruction.

Figure 3:
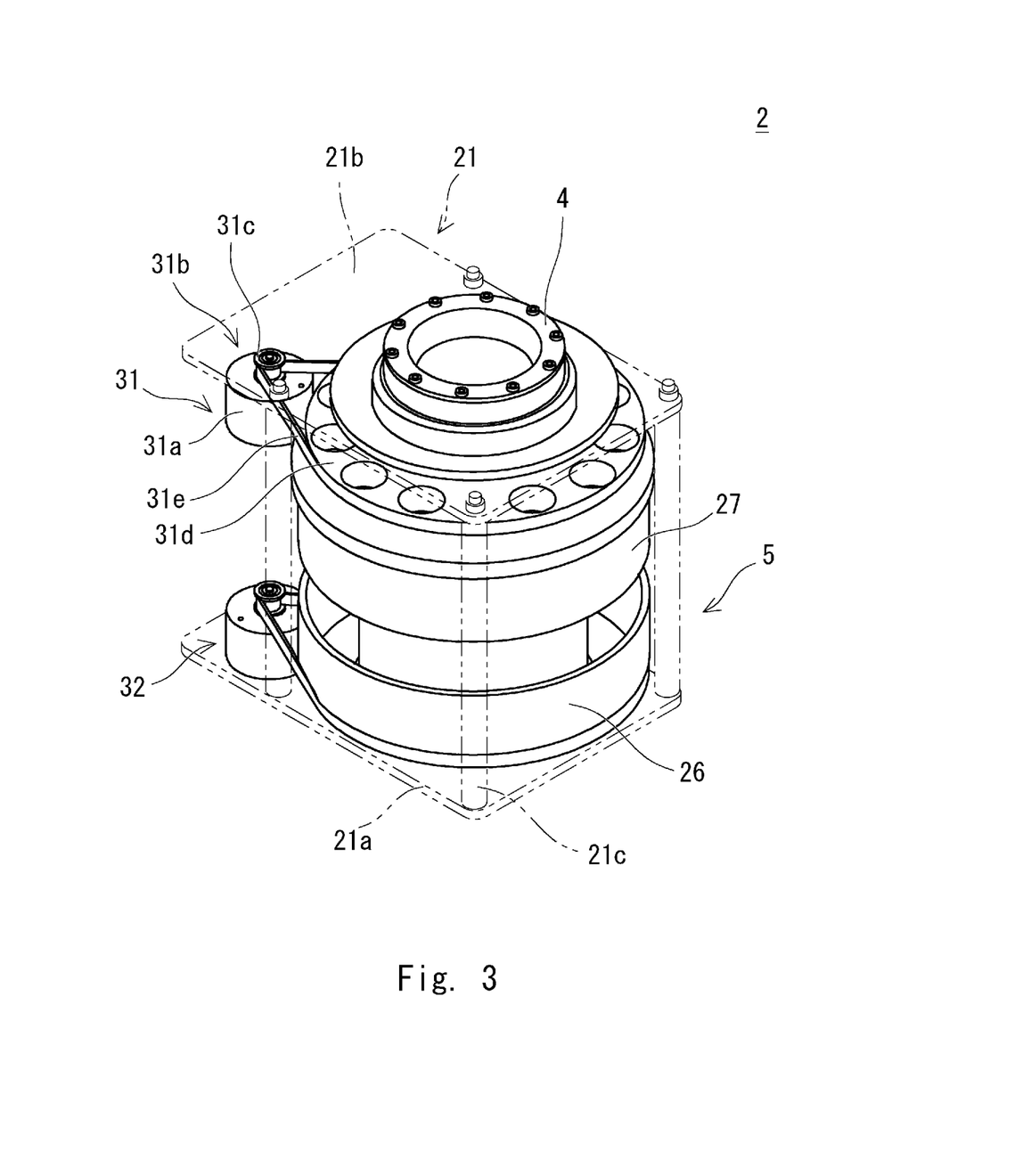
FIG. 3 is a perspective view showing an extension/contraction mechanism according to the embodiment.
Figure 4:
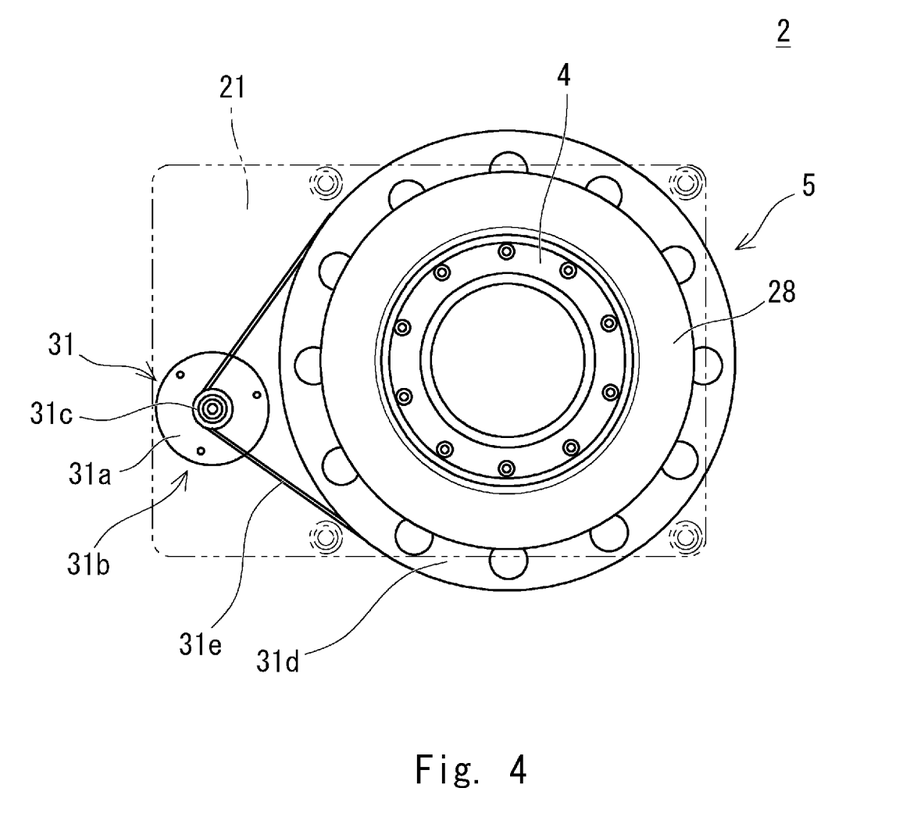
FIG. 4 is a plan view showing the extension/contraction mechanism according to the embodiment.
Figure 5:
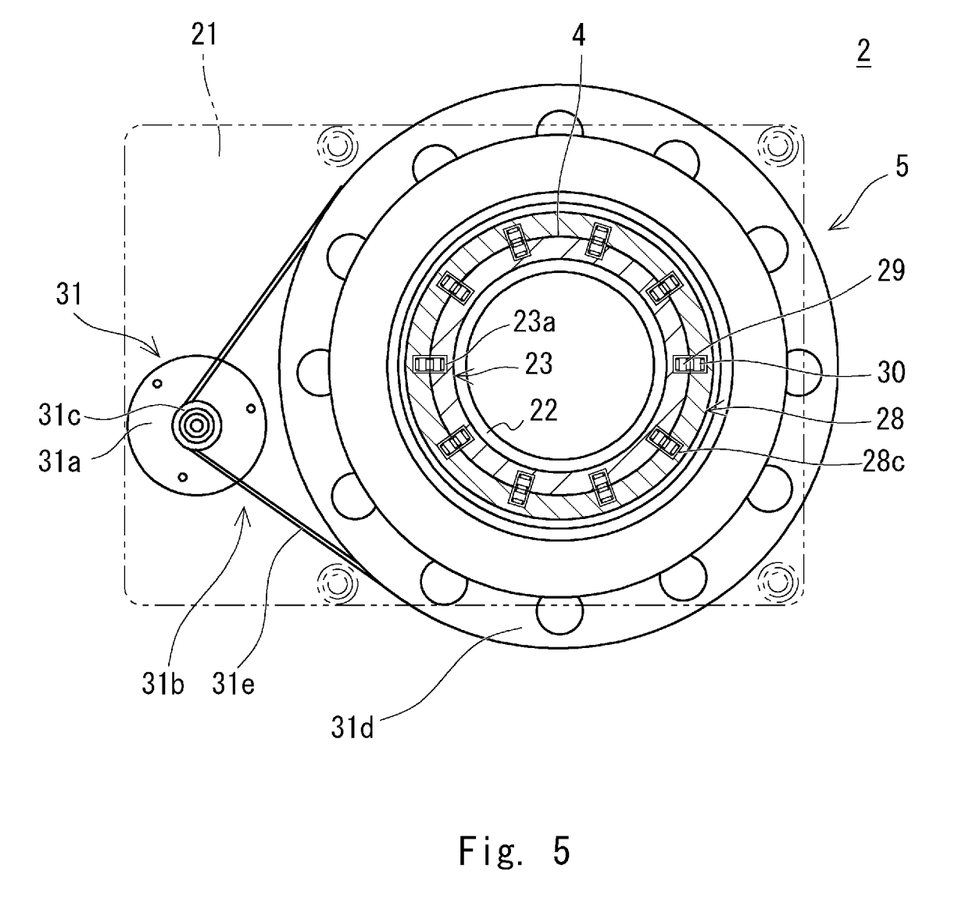
FIG. 5 is a horizontal cross-sectional view showing the extension/contraction mechanism according to the embodiment.
Figure 6:
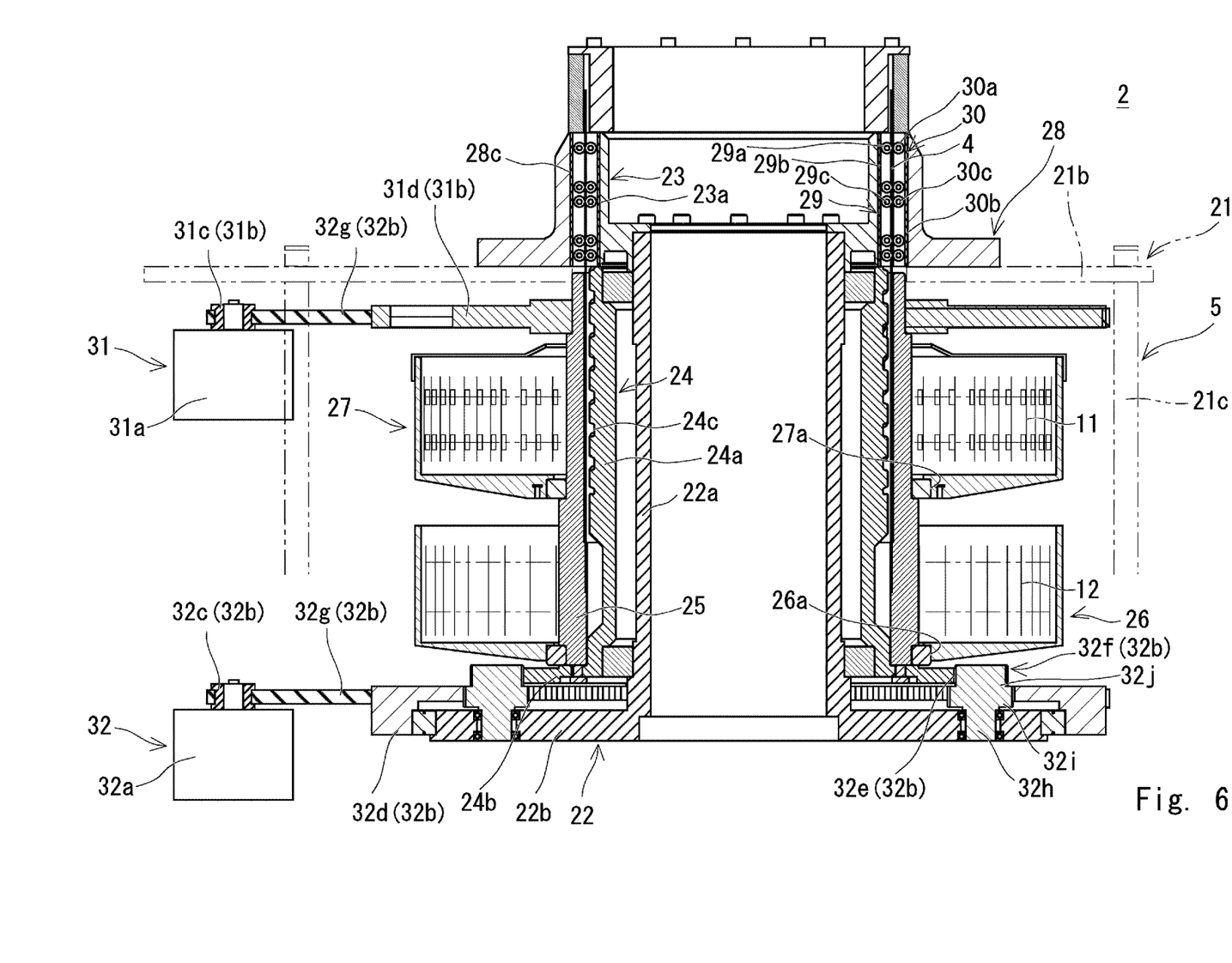
FIG. 6 is a vertical cross-sectional view showing the extension/contraction mechanism according to the embodiment.
Figure 7:
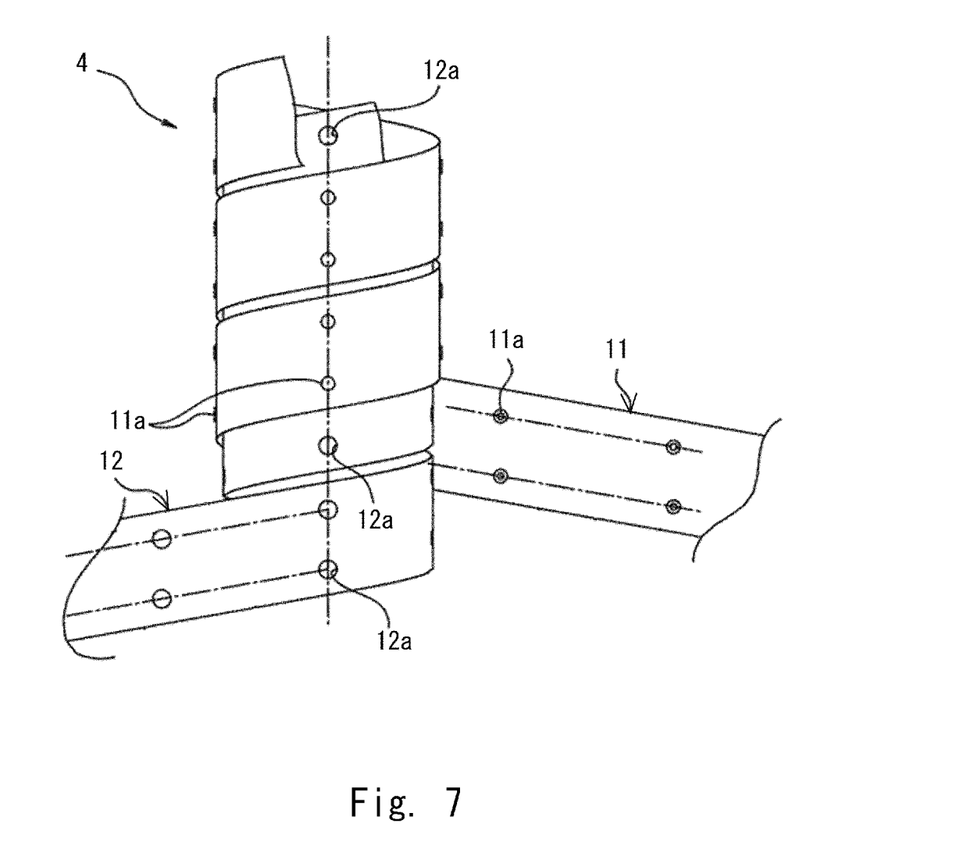
FIG. 7 is a diagram for describing the extension/contraction part according to the embodiment.
Figure 8:
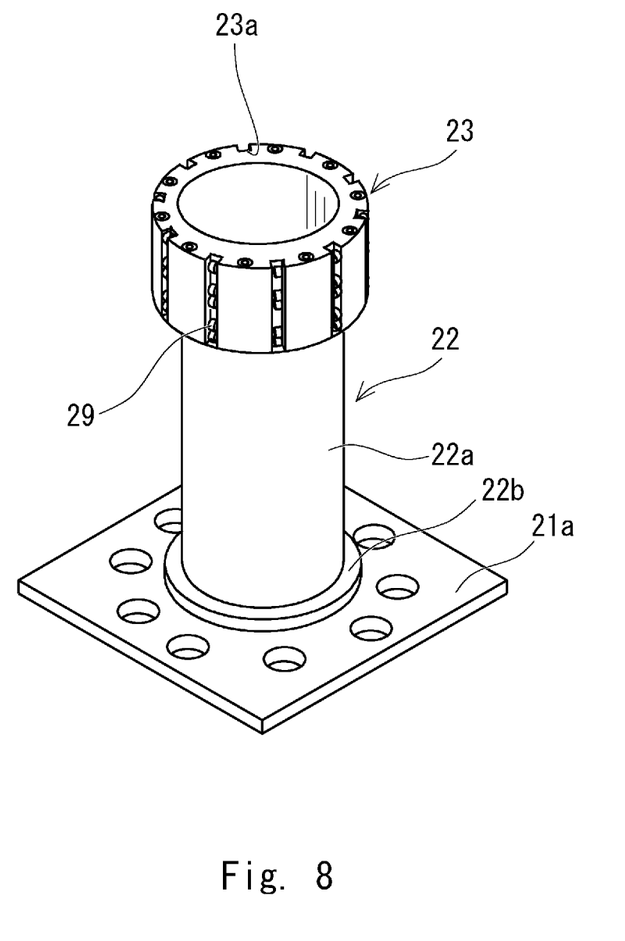
FIG. 8 is a perspective view showing a main shaft of the extension/contraction mechanism according to the embodiment.
Figure 9:
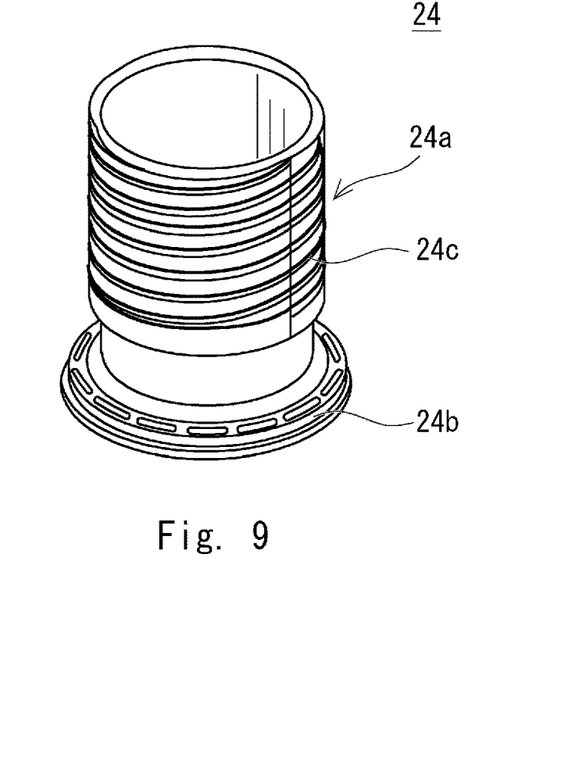
FIG. 9 is a perspective view showing a screw shaft of the extension/contraction mechanism according to the embodiment.
Figure 10:
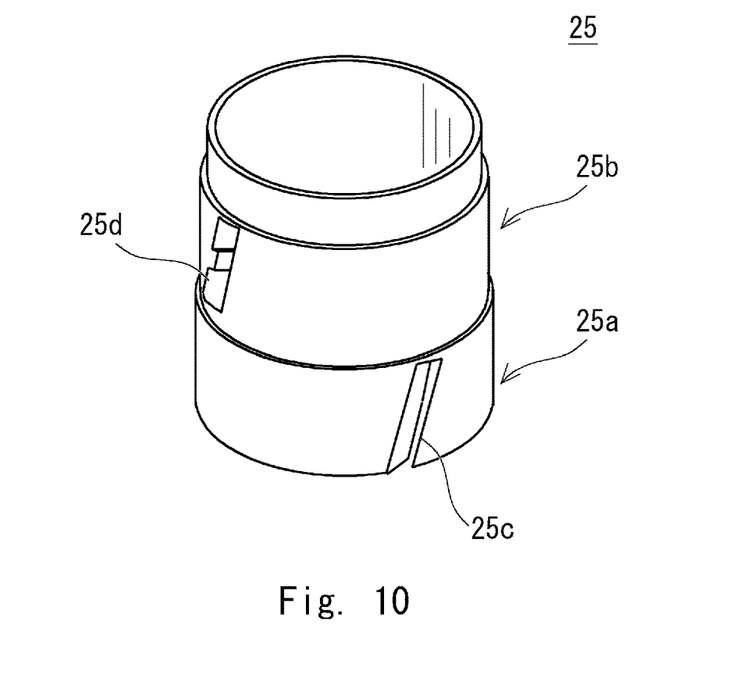
FIG. 10 is a perspective view showing a belt guide of the extension/contraction mechanism according to the embodiment.
Figure 11:
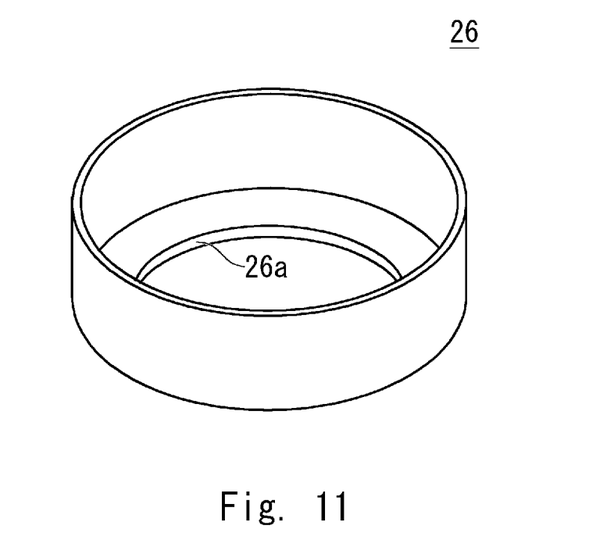
FIG. 11 is a perspective view showing a first belt holder of the extension/contraction mechanism according to the embodiment.
Figure 12:
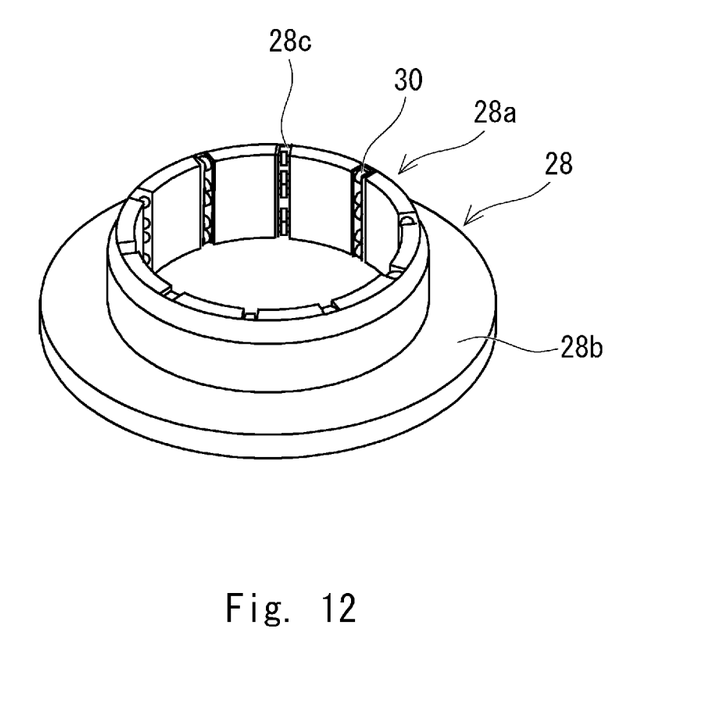
FIG. 12 is a perspective view showing a first roller holding part of the extension/contraction mechanism according to the embodiment.
Figure 13:
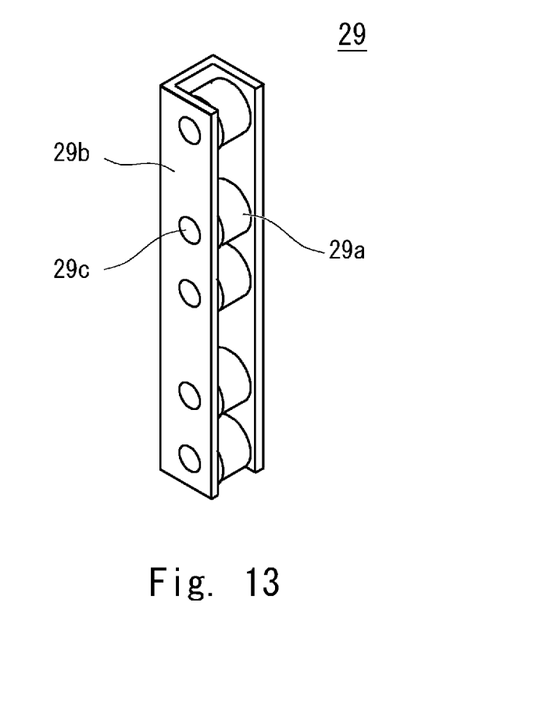
FIG. 13 is a perspective view showing a roller unit of the extension/contraction mechanism according to the embodiment.

Next, a structure of the extension/contraction mechanism 2 according to this embodiment will be described in detail. FIG. 3 is a perspective view showing the extension/contraction mechanism according to this embodiment. FIG. 4 is a plan view showing the extension/contraction mechanism according to this embodiment. FIG. 5 is a horizontal cross-sectional view showing the extension/contraction mechanism according to this embodiment. FIG. 6 is a vertical cross-sectional view showing the extension/contraction mechanism according to this embodiment. FIG. 7 is a diagram for describing the extension/contraction part according to this embodiment. FIG. 8 is a perspective view showing a main shaft and the like of the extension/contraction mechanism according to this embodiment. FIG. 9 is a perspective view showing a screw shaft of the extension/contraction mechanism according to this embodiment. FIG. 10 is a perspective view showing a belt guide of the extension/contraction mechanism according to this embodiment. FIG. 11 is a perspective view showing a first belt holder of the extension/contraction mechanism according to this embodiment. FIG. 12 is a perspective view showing a first roller holding part of the extension/contraction mechanism according to this embodiment. FIG. 13 is a perspective view showing a roller unit of the extension/contraction mechanism according to this embodiment.

As described above, the extension/contraction mechanism 2 according to this embodiment includes the extension/contraction part 4 and the base part 5, as shown in FIGS. 3 to 6. As shown in FIG. 7, the extension/contraction part 4 includes a first belt 11 and a second belt 12. The first belt 11, which is, for example, a strip-shaped body made of steel, is provided with engagement pins 11a at substantially equal intervals along opposing long sides of the first belt 11. The second belt 12, which is, for example, a strip-shaped body made of steel having a thickness that is equal to that of the first belt 11, is provided with engagement holes 12a in such a way that the engagement holes 12a correspond to the pitches of the engagement pins 11a along the opposing long sides of the second belt 12.

The second belt 12 is arranged inside the first belt 11 in advance, and the first belt 11 and the second belt 12 are wound in a spiral shape in such a way that they are offset from each other, thereby forming the extension/contraction part 4. At this time, the engagement pins 11a of the first belt 11 are protruded toward the inside of the extension/contraction part 4, the engagement pins 11a on the upper side of the first belt 11 are engaged with the engagement holes 12a on the lower side of the second belt 12 arranged to be shifted upward with respect to the first belt 11 and the engagement pins 11a on the lower side of the first belt 11 are engaged with the engagement holes 12a on the upper side of the second belt 12 arranged to be shifted downward with respect to the first belt 11.

As shown in FIGS. 3 to 6, the base part 5 includes a frame 21, a main shaft (a turning part) 22, a first roller holding part 23, a screw shaft (a sending/pulling part) 24, a belt guide 25, a first belt holder 26, a second belt holder 27, a second roller holding part 28, a first roller unit 29, a second roller unit 30, a first drive part 31, and a second drive part 32. FIGS. 3 to 6 each show the frame 21 by an alternate long and two short dashes line so that the structure of the extension/contraction mechanism 2 becomes clear.

As shown in FIG. 3, the frame 21 includes a first plate 21a, a second plate 21b, and struts 21c. The first plate 21a is a plate-shaped body having a substantially flat upper surface. The second plate 21b, which is a plate-shaped body having a substantially flat upper surface, is arranged above the first plate 21a. A through-hole is formed in the second plate 21b. The struts 21c, which are provided in edge parts of the first plate 21a, couple the first plate 21a with the second plate 21b.

As shown in FIG. 8, the main shaft 22 includes a cylindrical part 22a and a flange part 22b that is protruded outward from the lower end part of the cylindrical part 22a and the lower end part of the main shaft 22 is rotatably supported by the first plate 21a. As shown in FIG. 6, the upper end part of the cylindrical part 22a in this main shaft 22 is protruded upward from the second plate 21b in a state in which it is made to pass through the through-hole of the second plate 21b in the frame 21.

As shown in FIG. 8, the first roller holding part 23 is a cylindrical body, and groove parts 23a that are extended in the vertical direction are formed on the outer peripheral surface of the first roller holding part 23. The groove parts 23a are arranged, for example, at substantially equal intervals in the circumferential direction of the first roller holding part 23. This first roller holding part 23 is fixed to the upper end part of the cylindrical part 22a in the main shaft 22. As shown in FIG. 9, the screw shaft 24 includes a cylindrical part 24a and a flange part 24b. Groove parts 24c having a spiral shape into which the engagement pins 11a of the first belt 11 are inserted are formed on the outer peripheral surface of the cylindrical part 24a. The flange part 24b is protruded outward from the lower end part of the cylindrical part 24a.

Then, as shown in FIG. 6, the cylindrical part 22a of the main shaft 22 is made to pass through the screw shaft 24, and the screw shaft 24 is arranged between the flange part 22b of the main shaft 22 and the first roller holding part 23 in a state in which the screw shaft 24 can be rotated with respect to the main shaft 22.

As shown in FIG. 10, the belt guide 25, which has a cylindrical body as its basic form, includes a first part 25a having a first outer diameter and a second part 25b that has a second outer diameter that is smaller than the first outer diameter and is arranged above the first part 25a.

An opening 25c through which the second belt 12 passes is formed in the first part 25a of the belt guide 25. An opening 25d through which the first belt 11 passes is formed in the second part 25b of the belt guide 25.

Then, as shown in FIG. 6, the cylindrical part 24a of the screw shaft 24 is passed inside the belt guide 25 and the lower end part of the belt guide 25 is fixed to the flange part 24b of the screw shaft 24.

Accordingly, the screw shaft 24 and the belt guide 25 can be rotated about the main shaft 22. At this time, a gap through which the first belt 11 overlapping the second belt 12 can pass is formed between the outer peripheral surface of the cylindrical part 24a of the screw shaft 24 and the inner peripheral surface of the belt guide 25.

The first belt holder 26 accommodates the second belt 12 which is in a state before it forms the extension/contraction part 4. As shown in FIG. 11, the first belt holder 26 has a bottomed cylindrical body as its basic form, and a through-hole 26a is formed in the bottom part of the first belt holder 26.

Then, as shown in FIG. 6, the belt guide 25 is made to pass through the through-hole 26a of the first belt holder 26 and the first belt holder 26 is supported by the flange part 24b of the screw shaft 24 in a state in which the first belt holder 26 can be rotated with respect to the belt guide 25.

The second belt holder 27 accommodates the first belt 11 which is in a state before it forms the extension/contraction part 4. The second belt holder 27 has a shape substantially equal to that of the first belt holder 26 and a through-hole 27a is formed in the bottom part of the second belt holder 27.

As shown in FIG. 6, the second belt holder 27 is arranged above the first belt holder 26. Then the belt guide 25 is made to pass through the through-hole 27a of the second belt holder 27 and the second belt holder 27 is supported by a step part between the first part 25a and the second part 25b in the belt guide 25 in a state in which the second belt holder 27 can be rotated with respect to the belt guide 25.

As shown in FIG. 12, the second roller holding part 28 includes a cylindrical part 28a and a flange part 28b. The cylindrical part 28a has an inner diameter that is larger than the outer diameter of the first roller holding part 23 and groove parts 28c that are extended in the vertical direction are formed on the inner peripheral surface of the cylindrical part 28a. The groove parts 28c are arranged, for example, at substantially equal intervals in the circumferential direction of the cylindrical part 28a. The flange part 28b is formed in such a way that it is protruded outward from the lower end part of the cylindrical part 28a.

Then, as shown in FIG. 6, the flange part 28b of the second roller holding part 28 is fixed to the second plate 21b of the frame 21 in a state in which the first roller holding part 23 is made to pass inside the second roller holding part 28. At this time, as shown in FIG. 5, the groove parts 23a of the first roller holding part 23 and the groove parts 28c of the second roller holding part 28 may be arranged so that they are substantially opposed to each other.

As shown in FIG. 13, the first roller unit 29 includes rollers 29a and a fixing tool 29b. The rollers 29a, which can be rotated about a rotation shaft 29c that is extended in the substantially horizontal direction, are aligned in the vertical direction.

The fixing tool 29b, which is formed in a substantially C-shape when it is seen from the vertical direction, supports the rollers 29a via the rotation shaft 29c in a state in which the rollers 29a are arranged inside the fixing tool 29b. This first roller unit 29 is fitted into the groove parts 23a of the first roller holding part 23 and is fixed therein.

While the detailed description of the second roller unit 30 is omitted since the structure thereof is the same as that of the first roller unit 29, the rollers 30a aligned in the vertical direction are fixed to the fixing tool 30b via the rotation shaft 30c in such a way that the rollers 30a can be rotated. As shown in FIG. 12, the second roller unit 30 is fitted into the groove parts 28c of the second roller holding part 28 and is fixed therein.

At this time, a gap through which the first belt 11 and the second belt 12 can pass in a state in which they overlap each other is formed between the rollers 29a of the first roller unit 29 and the rollers 30a of the second roller unit 30, and when this gap is seen from the vertical direction, it is seen that it substantially overlaps the gap between the outer peripheral surface of the cylindrical part 24a of the screw shaft 24 and the inner peripheral surface of the belt guide 25.

The rollers 29a of the first roller unit 29 and the rollers 30a of the second roller unit 30 are arranged in such a way that, when the first belt 11 and the second belt 12 pass through the gap between the rollers 29a of the first roller unit 29 and the rollers 30a of the second roller unit 30 in a state in which the first belt 11 and the second belt 12 overlap each other, the rollers 29a of the first roller unit 29 come in contact with the inner peripheral surface of the second belt 12 and the rollers 30a of the second roller unit 30 come in contact with the outer peripheral surface of the first belt 11.

As shown in FIG. 6, the first drive part 31 includes a motor (a first drive source) 31a and a drive transmission part 31b. The motor 31a is supported by the second plate 21b of the frame 21, although the motor 31a is not specifically shown in FIG. 6. The drive transmission part 31b includes a pinion gear 31c, a pulley 31d, and a belt 31e.

The pinion gear 31c is fixed to the output shaft of the motor 31a. The pulley 31d is a ring gear having a tooth part formed on the outer peripheral surface thereof, and the inner peripheral part of the pulley 31d is fixed to the upper end part of the belt guide 25 in such a way that it can transmit a drive force. The belt 31e, which is an endless belt in which a tooth part is formed on the inner peripheral surface thereof, bridges the pinion gear 31c and the pulley 31d.

As shown in FIG. 6, the second drive part 32 includes a motor (a second drive source) 32a and a drive transmission part 32b. The motor 32a is supported by the first plate 21a of the frame 21 although the motor 32a is not specifically shown in FIG. 6. The drive transmission part 32b includes a pinion gear 32c, a ring gear (a first gear) 32d, an external tooth part 32e, a planet gear 32f, and a belt 32g.

Figure 14:
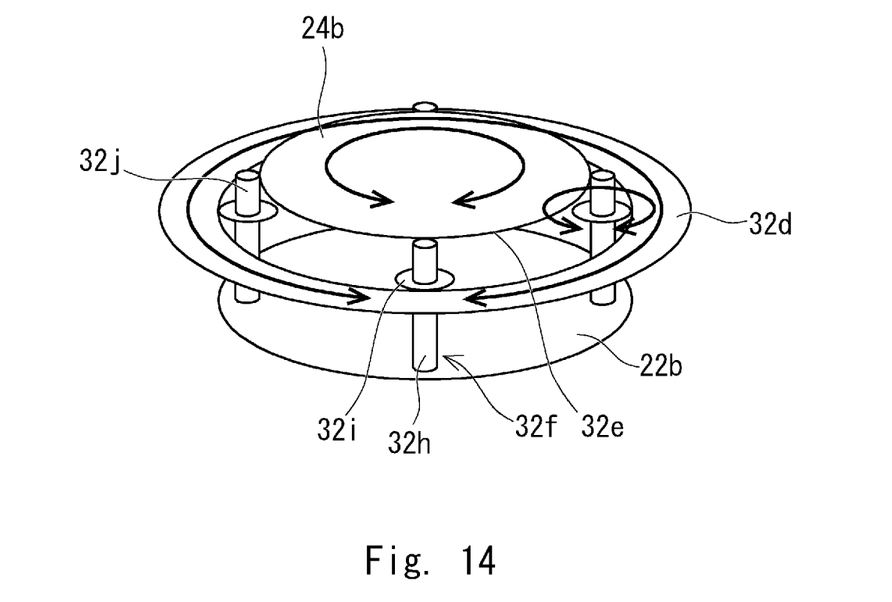
FIG. 14 is a perspective view for describing a drive transmission part of a second drive part in the extension/contraction mechanism according to the embodiment.
Figure 15:
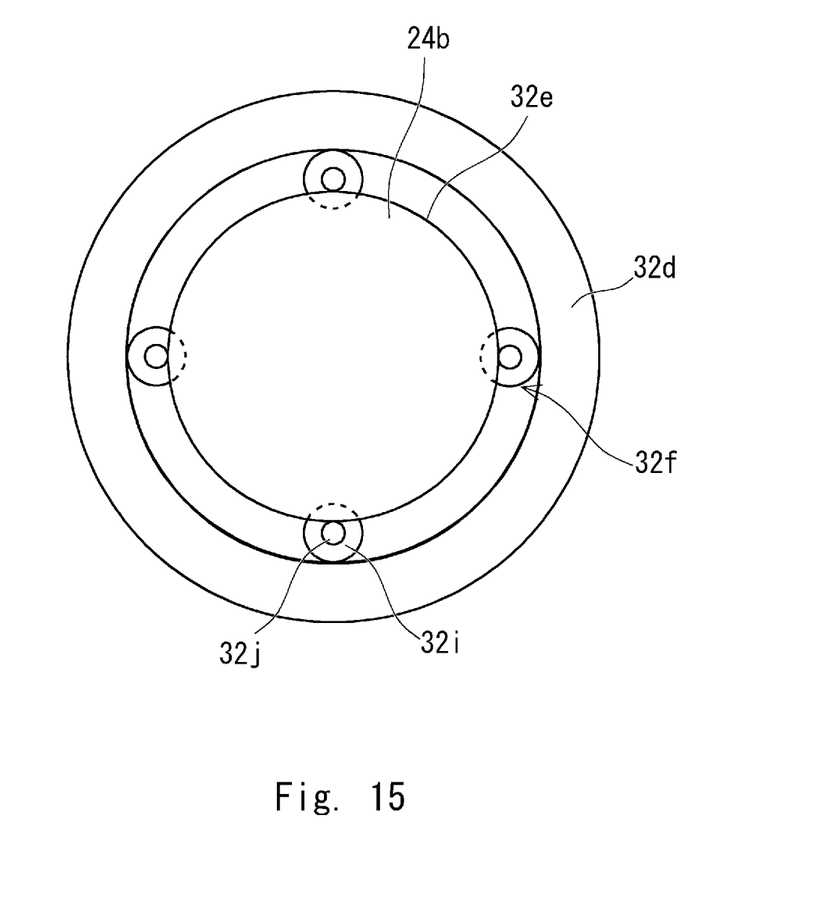
FIG. 15 is a plan view for describing the drive transmission part of the second drive part in the extension/contraction mechanism according to the embodiment.
Figure 16:
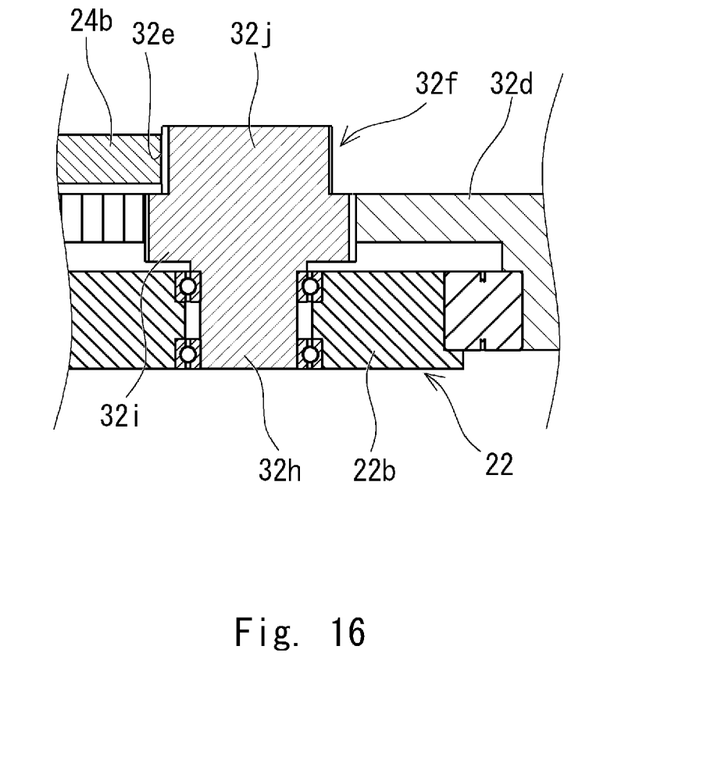
FIG. 16 is a cross-sectional view showing an area near a planet gear of the second drive part in the extension/contraction mechanism according to the embodiment in an enlarged manner.

FIG. 14 is a perspective view for describing a drive transmission part of the second drive part in the extension/contraction mechanism according to this embodiment. FIG. 15 is a plan view for describing the drive transmission part of the second drive part in the extension/contraction mechanism according to this embodiment. FIG. 16 is a cross-sectional view showing an area near the planet gear of the second drive part in the extension/contraction mechanism according to this embodiment in an enlarged manner.

As shown in FIG. 6, the pinion gear 32c is fixed to the output shaft of the motor 32a. As shown in FIGS. 6 and 16, the ring gear 32d is rotatably supported by the flange part 22b of the main shaft 22 and a tooth part is formed on each of the outer peripheral surface and the inner peripheral surface of the ring gear 32d. The external tooth part 32e is formed on the outer peripheral surface of the flange part 24b of the screw shaft 24.

As FIGS. 14 and 16, the planet gear 32f includes a rotation shaft 32h, a first gear part (a second gear) 32i, and a second gear part (a third gear) 32j. The rotation shaft 32h is extended in the vertical direction, and the lower end part of the rotation shaft 32h is rotatably supported by the flange part 22b of the main shaft 22. As shown in FIGS. 14 to 16, the first gear part 32i, which is a gear provided in the rotation shaft 32h, is engaged with the tooth part formed on the inner peripheral surface of the ring gear 32d.

As shown in FIGS. 14 and 16, the second gear part 32j, which is a gear provided in the rotation shaft 32h, is engaged with the external tooth part 32e formed in the flange part 24b of the screw shaft 24. In this case, while the second gear part 32j is arranged above the first gear part 32i in FIGS. 14 and 16, the second gear part 32j may be arranged below the first gear part 32i.

In the first drive part 31 and the second drive part 32 described above, when the rotational speed transmitted to the screw shaft 24 to rotate the screw shaft 24 by the first drive part 31 is equal to the rotational speed transmitted to the screw shaft 24 to rotate the screw shaft 24 by the second drive part 32, the extension/contraction part 4 turns via the main shaft 22. When the above rotational speeds are different from each other, the extension/contraction part 4 is extended or contracted.

In other words, when the rotational speed of the screw shaft 24 for rotating the screw shaft 24 by the first drive part 31 is equal to the rotational speed of the screw shaft 24 for rotating the screw shaft 24 by the second drive part 32, the extension/contraction part 4 turns via the main shaft 22. When the above rotational speeds are different from each other, the extension/contraction part 4 is extended or contracted. The "rotational speed" is indicated by "+" and "−", in which "+" indicates the rotation of the screw shaft 24 in one direction and "−" indicates the rotation of the screw shaft 24 in the other direction when the mobile body 1 is seen from above.

In this case, the first drive part 31 and the second drive part 32 may satisfy, for example, the following condition. Since the extending/contracting motion of the extension/contraction part 4 is the difference between the amount of rotation of the main shaft 22 and that of the screw shaft 24, it can be expressed by the following <Expression 1>.

$$v_p = p(\omega_s - \omega_m) \qquad \text{<Expression 1>}$$

The symbol $v_p$ denotes the extension/contraction speed of the extension/contraction part 4, p denotes a pitch length of the groove parts 24c of the screw shaft 24, $\omega_s$ denotes the rotational speed of the screw shaft 24, and $\omega_m$ denotes the rotational speed of the main shaft 22.

At this time, since the rotational speed $\omega_p$ of the frame 21 with respect to the main shaft 22 matches the rotational speed of the main shaft 22, it can be expressed by the following <Expression 2>.

$$\omega_p = \omega_m \qquad \text{<Expression 2>}$$

From the relation of the planet gear 32f, the following <Expression 3> is satisfied.

$$\begin{cases} \omega_s = \omega_m - \dfrac{Z_1}{Z_s}\omega_y \\ \omega_i = \omega_m - \dfrac{Z_2}{Z_i}\omega_y \end{cases} \qquad \text{<Expression 3>}$$

The symbol $Z_1$ denotes the number of teeth of the second gear part 32j of the planet gear 32f, $Z_s$ denotes the number of teeth of the external tooth part 32e formed in the flange part 24b of the screw shaft 24, denotes the rotating speed of the planet gear 32f, $\omega_i$ denotes the rotational speed of the ring gear 32d, $Z_2$ denotes the number of teeth of the first gear part 32i of the planet gear 32f, and $Z_i$ denotes the number of teeth of the tooth part formed on the inner peripheral surface of the ring gear 32d.

In this case, it is assumed that <Expression 4> is satisfied.

$$\dfrac{Z_1}{Z_s} = \dfrac{Z_2}{Z_i} \qquad \text{<Expression 4>}$$

From the above discussion, <Expression 5> can be derived by deleting $\omega_y$.

$$\begin{cases} v_p = \dfrac{p}{2}(\omega_s - \omega_i) \\ \omega_p = \dfrac{1}{2}(\omega_s + \omega_i) \end{cases} \qquad \text{<Expression 5>}$$

Therefore, when <Expression 6> is satisfied, <Expression 7> can be derived.

$$J = \dfrac{1}{2}\begin{pmatrix} p & -p \\ 1 & 1 \end{pmatrix} \qquad \text{<Expression 6>}$$

$$\begin{pmatrix} v_p \\ \omega_p \end{pmatrix} = J \begin{pmatrix} \omega_s \\ \omega_i \end{pmatrix} \qquad \text{<Expression 7>}$$

By using an inverse matrix, <Expression 8> may be satisfied.

$$\begin{pmatrix} \omega_s \\ \omega_i \end{pmatrix} = J^{-1}\begin{pmatrix} v_p \\ \omega_p \end{pmatrix} = \dfrac{1}{p}\begin{pmatrix} 1 & p \\ -1 & p \end{pmatrix}\begin{pmatrix} v_p \\ \omega_p \end{pmatrix} \qquad \text{<Expression 8>}$$

Further, from a static relationship, <Expression 9> may be satisfied.

$$\begin{pmatrix} \tau_s \\ \tau_i \end{pmatrix} = J^T \begin{pmatrix} F_p \\ T_p \end{pmatrix} = \dfrac{1}{2}\begin{pmatrix} p & 1 \\ -p & 1 \end{pmatrix}\begin{pmatrix} F_p \\ T_p \end{pmatrix} \qquad \text{<Expression 9>}$$

The symbol $\tau_s$ denotes torque input to the screw shaft 24, $\tau_i$ denotes torque input to the ring gear 32d, $F_p$ denotes an extension/contraction force of the extension/contraction part 4, and $T_p$ denotes output torque of the frame 21 with respect to the main shaft 22.

When the extension/contraction part 4 performs only the extending/contracting motion, if the following conditions <Expression 10> and <Expression 11> are satisfied, then <Expression 12> and <Expression 13> may be satisfied.

$$\begin{pmatrix} F_p \\ T_p \end{pmatrix} = \begin{pmatrix} 1 \\ 0 \end{pmatrix} \qquad \text{<Expression 10>}$$

$$\begin{pmatrix} v_p \\ \omega_p \end{pmatrix} = \begin{pmatrix} 1 \\ 0 \end{pmatrix} \qquad \text{<Expression 11>}$$

$$\begin{pmatrix} \tau_s \\ \tau_i \end{pmatrix} = \dfrac{1}{2}\begin{pmatrix} p \\ -p \end{pmatrix} \qquad \text{<Expression 12>}$$

$$\begin{pmatrix} \omega_s \\ \omega_i \end{pmatrix} = \dfrac{1}{p}\begin{pmatrix} 1 \\ -1 \end{pmatrix} \qquad \text{<Expression 13>}$$

On the other hand, when the extension/contraction part 4 performs only the turning motion, if the following conditions <Expression 14> and <Expression 15> are satisfied, then <Expression 16> and <Expression 17> may be satisfied.

$$\begin{pmatrix} F_p \\ T_p \end{pmatrix} = \begin{pmatrix} 0 \\ 1 \end{pmatrix} \qquad \text{<Expression 14>}$$

$$\begin{pmatrix} v_p \\ \omega_p \end{pmatrix} = \begin{pmatrix} 0 \\ 1 \end{pmatrix} \qquad \text{<Expression 15>}$$

$$\begin{pmatrix} \tau_s \\ \tau_i \end{pmatrix} = \dfrac{1}{2}\begin{pmatrix} 1 \\ 1 \end{pmatrix} \qquad \text{<Expression 16>}$$

$$\begin{pmatrix} \omega_s \\ \omega_i \end{pmatrix} = \dfrac{1}{p}\begin{pmatrix} p \\ p \end{pmatrix} \qquad \text{<Expression 17>}$$

Therefore, in both the extending/contracting motion and the turning motion of the extension/contraction part 4, the output of the motor 31a of the first drive part 31 and the output of the motor 32a of the second drive part 32 can be combined with each other.

Since <Expression 4>, which is assumed above, is to obtain the above relation when equivalent outputs can be obtained from the motor 31a of the first drive part 31 and the motor 32a of the second drive part 32, if, for example, the output of the motor 31a of the first drive part 31 is different from the output of the motor 32a of the second drive part 32, <Expression 4> may not necessarily be satisfied.

Next, operations when the extension/contraction part 4 of the extension/contraction mechanism 2 according to this embodiment is extended or contracted will be described. The motor 31a of the first drive part 31 and the motor 32a of the second drive part 32 are rotationally driven in such a way that the rotational speed transmitted to the screw shaft 24 to rotate the screw shaft 24 by the first drive part 31 becomes different from the rotational speed transmitted to the screw shaft 24 to rotate the screw shaft 24 by the second drive part 32, the rotational drive force of the motor 31a is transmitted to the screw shaft 24 via the drive transmission part 31b of the first drive part 31 and the belt guide 25, and the rotational drive force of the motor 32a is transmitted to the main shaft 22 and the screw shaft 24 via the drive transmission part 32b of the second drive part 32.

Accordingly, the screw shaft 24 is differentially rotated with respect to the main shaft 22, and this rotation of the screw shaft 24 causes the extension/contraction part 4 to be extended while the first belt 11 and the second belt 12 are drawn and wound in a spiral shape or causes the extension/contraction part 4 to be contracted while the state in which the first belt 11 and the second belt 12 are engaged with each other and wound is loosened.

At this time, in the mobile body 1 and the extension/contraction mechanism 2 according to this embodiment, the lower part of the extension/contraction part 4 is held by the rollers 29a of the first roller unit 29 and the rollers 30a of the second roller unit 30 in the thickness direction of the extension/contraction part 4, whereby it is possible to prevent a swing of the extension/contraction part 4.

Next, operations when the extension/contraction part 4 of the extension/contraction mechanism 2 according to this embodiment turns will be described. The motor 31a of the first drive part 31 and the motor 32a of the second drive part 32 are rotationally driven in such a way that the rotational speed transmitted to the screw shaft 24 to rotate the screw shaft 24 by the first drive part 31 becomes equal to the rotational speed transmitted to the screw shaft 24 to rotate the screw shaft 24 by the second drive part 32, thereby transmitting the rotational drive force of the motor 31a to the screw shaft 24 via the drive transmission part 31b of the first drive part 31 and the belt guide 25 and transmitting the rotational drive force of the motor 32a to the main shaft 22 and the screw shaft 24 via the drive transmission part 32b of the second drive part 32.

Accordingly, the main shaft 22 and the screw shaft 24 are equally rotated, the main shaft 22, the screw shaft 24, the belt guide 25, and the extension/contraction part 4 are integrally rotated, as a result of which the extension/contraction part 4 turns with respect to the base part 5.

As described above, the mobile body 1 and the extension/contraction mechanism 2 according to this embodiment are able to achieve the extending/contracting motion and the turning motion of the extension/contraction part 4 by the first drive part 31 and the second drive part 32. In addition, the output of the motor 31a of the first drive part 31 and the output of the motor 32a of the second drive part 32 are combined with each other, whereby it is possible to achieve the extending/contracting motion and the turning motion of the extension/contraction part 4. Therefore, the size of the motors 31a and 32a can be reduced compared to that in the case in which the extending/contracting motion and the turning motion of the extension/contraction part 4 are achieved separately by outputs of respective motors using two motors, which contributes to reducing the size and the weight of the mobile body 1.

The present disclosure is not limited to the above embodiments and may be changed as appropriate without departing from the spirit of the present disclosure.

For example, while the extension/contraction part 4 according to the above embodiment is described taking a telescopic extension/contraction part as an example, the extension/contraction part 4 may have any configuration as long as it can be extended or contracted by rotation of the sending/pulling part.

For example, while the extension/contraction mechanism 2 according to the above embodiment includes the first roller unit 29 and the second roller unit 30, the first roller unit 29 and the second roller unit 30 may be omitted.

For example, the first drive part 31 and the second drive part 32 according to the above embodiment are merely examples, and they may include a configuration in which the extension/contraction part 4 turns via the main shaft 22 when the rotational speed transmitted to the screw shaft 24 in order to rotate the screw shaft 24 by the first drive source 31 is equal to the rotational speed transmitted to the screw shaft 24 in order to rotate the screw shaft 24 by the second drive source 32 and the extension/contraction part 4 is contracted when the above rotational speeds are different from each other.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An extension/contraction mechanism comprising an extension/contraction part that is extended when a sending/pulling part is rotated in one direction and is contracted when the sending/pulling part is rotated in another direction, the extension/contraction mechanism comprising:
    a first drive source connected to the sending/pulling part in such a way that the first drive source is able to transmit a drive force to the sending/pulling part; and
    a second drive source connected to the sending/pulling part and a turning part that rotatably supports the sending/pulling part in such a way that the second drive source is able to transmit a drive force to the sending/pulling part and the turning part via a gear group, wherein
    when a rotational speed to be transmitted to the sending/pulling part in order to rotate the sending/pulling part by the first drive source is equal to a rotational speed to be transmitted to the sending/pulling part in order to rotate the sending/pulling part by the second drive source, the extension/contraction part turns via the turning part, and
    when the rotational speed to be transmitted to the sending/pulling part in order to rotate the sending/pulling part by the first drive source is different from the rotational speed to be transmitted to the sending/pulling part in order to rotate the sending/pulling part by the second drive source, the extension/contraction part is extended or contracted.

2. The extension/contraction mechanism according to claim 1, wherein
    the gear group comprises:
        a first gear to which a drive force is input from the second drive source; and
        a planetary gear rotatably supported by the turning part, and
    the planetary gear comprises:
        a second gear connected to a tooth part formed on an inner peripheral surface of the first gear in such a way that the second gear is able to transmit a drive force to the tooth part;
        a third gear connected to a tooth part formed on an outer peripheral surface of the sending/pulling part in such a way that the third gear is able to transmit a drive force to the tooth part; and
        a rotation shaft that is rotatably supported by the turning part and to which the second gear and the third gear are fixed.

3. The extension/contraction mechanism according to claim 1, wherein the extension/contraction part is extended when the sending/pulling part is rotated in one direction, a first belt and a second belt are sent out, and the first belt and the second belt are engaged with each other and wound in a spiral shape, and the extension/contraction part is contracted when the sending/pulling part is rotated in another direction, the first belt and the second belt are retracted, and the state in which the first belt and the second belt are engaged with each other and wound is loosened.

4. A mobile body comprising the extension/contraction mechanism according to claim 1.

* * * * *